(12) United States Patent
Champoux et al.

(10) Patent No.: US 11,623,707 B2
(45) Date of Patent: Apr. 11, 2023

(54) COLLISION ALERT SYSTEMS AND METHODS FOR MICROMOBILITY VEHICLES

(71) Applicant: GEKOT Inc., Bloomfield Hills, MI (US)

(72) Inventors: Dan Champoux, Bloomfield Hills, MI (US); Autumn Mahoney, Ferndale, MI (US); Honor Hutchison, Troy, MI (US); Elias Cengeri, Bloomfield Hills, MI (US); Julia Mahoney, Royal Oak, MI (US); Keira Mahoney, Royal Oak, MI (US); Evan Welch, Bloomfield Hills, MI (US); Mihir Shah, Bloomfield Hills, MI (US); Lucas Chin, Bloomfield Hills, MI (US); Avani Nandalur, Bloomfield Hills, MI (US); Julia Xiao, Troy, MI (US); Katherine Konoya, Bloomfield Hills, MI (US)

(73) Assignee: GEKOT Inc., Bloomfield Hills, MI (US)

( * ) Notice: Subject to any disclaimer, the term of this patent is extended or adjusted under 35 U.S.C. 154(b) by 0 days.

(21) Appl. No.: 17/457,939

(22) Filed: Dec. 7, 2021

(65) Prior Publication Data

US 2022/0089238 A1 Mar. 24, 2022

Related U.S. Application Data

(63) Continuation of application No. 17/101,641, filed on Nov. 23, 2020.
(Continued)

(51) Int. Cl.
*B62J 6/24* (2020.01)
*B62J 6/26* (2020.01)
(Continued)

(52) U.S. Cl.
CPC . *B62J 6/24* (2020.02); *B62J 3/14* (2020.02); *B62J 6/26* (2020.02); *B62J 45/412* (2020.02);
(Continued)

(58) Field of Classification Search
CPC . B62J 3/14; B62J 45/412; B62J 45/415; B62J 50/21; B62J 6/24; B62J 6/26; G01S 17/931; G07C 5/008
See application file for complete search history.

(56) References Cited

U.S. PATENT DOCUMENTS 3,441,858 A * 4/1969 Gordon ............... G08B 1/08
340/7.22
4,369,426 A * 1/1983 Merkel ............... G08B 25/016
340/904
(Continued)

FOREIGN PATENT DOCUMENTS

CN 1362923 A 8/2002
CN 102328629 A 1/2012
(Continued)

OTHER PUBLICATIONS

"E-scooters embrace AI to cut down on pedestrian collisions," N. Lewis, CNN Business, <https://www.cnn.com/2021/02/24/business/e-scooter-safety-tech-ai-voi-spc-intl/index.html>. Feb. 24, 2021, 5 Pages.
(Continued)

*Primary Examiner* — Daniel L Greene
(74) *Attorney, Agent, or Firm* — Harness, Dickey & Pierce, P.L.C.

(57) ABSTRACT

Collision alert systems and methods for micromobility vehicles include a proximity sensor, a speed sensor, a warning device, and a controller having a bypass mode and a warning mode. The controller compares the speed of the micromobility vehicle with a predetermined speed thresh-
(Continued)

old, enters the bypass mode when the speed of the micromobility vehicle is less than the predetermined speed threshold, and enters the warning mode when the speed of the micromobility vehicle is greater than the predetermined speed threshold. The controller does not activate the warning device in the bypass mode. In the warning mode, the controller calculates an estimated time until a potential collision with the object, compares the estimated time object with a predetermined time threshold, and generates a collision warning by activating the warning device in response to the estimated time until collision being less than the predetermined time threshold.

12 Claims, 5 Drawing Sheets

Related U.S. Application Data

(60) Provisional application No. 63/000,086, filed on Mar. 26, 2020, provisional application No. 62/944,969, filed on Dec. 6, 2019.

(51) Int. Cl.
| | | |
|---|---|---|
| *B62J 50/21* | (2020.01) | |
| *B62J 45/415* | (2020.01) | |
| *G07C 5/00* | (2006.01) | |
| *B62J 3/14* | (2020.01) | |
| *G01S 17/931* | (2020.01) | |
| *B62J 45/412* | (2020.01) | |

(52) U.S. Cl.
CPC ............. *B62J 45/415* (2020.02); *B62J 50/21* (2020.02); *G01S 17/931* (2020.01); *G07C 5/008* (2013.01)

(56) References Cited

U.S. PATENT DOCUMENTS

| | | | | |
|---|---|---|---|---|
| 6,397,133 | B1* | 5/2002 | van der Pol | B60R 21/0132 |
| | | | | 340/440 |
| 7,359,821 | B1* | 4/2008 | Smith | G07C 5/002 |
| | | | | 702/113 |
| 9,511,751 | B2 | 12/2016 | Zagorski et al. | |
| 9,569,967 | B2 | 2/2017 | Petridis et al. | |
| 9,580,009 | B1 | 2/2017 | Lenker | |
| 9,953,534 | B1 | 4/2018 | Malla | |
| 10,117,802 | B2 | 11/2018 | Kasravi et al. | |
| 10,426,675 | B1 | 10/2019 | Erickson | |
| 2004/0085197 | A1 | 5/2004 | Watanabe et al. | |
| 2010/0079266 | A1* | 4/2010 | Holt | B62J 45/4151 |
| | | | | 340/436 |
| 2011/0125372 | A1 | 5/2011 | Ito | |
| 2012/0016544 | A1* | 1/2012 | Pariseau | B60L 50/66 |
| | | | | 33/300 |
| 2015/0066412 | A1* | 3/2015 | Nordbruch | B60W 40/00 |
| | | | | 702/104 |
| 2015/0073664 | A1 | 3/2015 | Petridis et al. | |
| 2015/0088377 | A1* | 3/2015 | Preusser | B60R 16/023 |
| | | | | 701/36 |
| 2016/0086391 | A1* | 3/2016 | Ricci | G06Q 30/06 |
| | | | | 701/29.3 |
| 2016/0280190 | A1 | 9/2016 | Franz | |
| 2016/0347241 | A1 | 12/2016 | Gralto | |
| 2018/0114440 | A1 | 4/2018 | Malla | |
| 2018/0196133 | A1* | 7/2018 | Sun | G01S 15/86 |
| 2019/0248439 | A1 | 8/2019 | Wang | |
| 2019/0259283 | A1 | 8/2019 | Sung et al. | |
| 2019/0283739 | A1 | 9/2019 | Kim et al. | |
| 2019/0375301 | A1 | 12/2019 | Whiff et al. | |
| 2020/0223506 | A1 | 7/2020 | Gilles | |
| 2020/0241129 | A1 | 7/2020 | Yu et al. | |
| 2020/0398923 | A1* | 12/2020 | Griffith | B62K 21/12 |

FOREIGN PATENT DOCUMENTS

| | | | |
|---|---|---|---|
| CN | 203211284 | U | 9/2013 |
| CN | 103448653 | A | 12/2013 |
| CN | 103946897 | A | 7/2014 |
| CN | 104442813 | A | 3/2015 |
| CN | 104751677 | A | 7/2015 |
| CN | 105314035 | A | 2/2016 |
| CN | 105492262 | A | 4/2016 |
| CN | 105894858 | A | 8/2016 |
| CN | 106625451 | A | 5/2017 |
| CN | 106945663 | A | 7/2017 |
| CN | 206307187 | U | 7/2017 |
| CN | 107554421 | A | 1/2018 |
| CN | 107972621 | A | 5/2018 |
| CN | 108263360 | A | 7/2018 |
| CN | 108885264 | A | 11/2018 |
| CN | 109476356 | A | 3/2019 |
| CN | 109789777 | A | 5/2019 |
| CN | 109955978 | A | 7/2019 |
| CN | 110182204 | A | 8/2019 |
| CN | 110304054 | A | 10/2019 |
| CN | 110525400 | A | 12/2019 |
| CN | 110641584 | A | 1/2020 |
| GB | 2386732 | | 9/2003 |
| GB | 2386732 | B | 7/2005 |
| JP | H04242895 | A | 8/1992 |
| JP | H06307859 | A | 11/1994 |
| KR | 20210031233 | A | 3/2021 |
| KR | 20210041770 | A | 4/2021 |
| WO | WO-03029045 | A2 | 4/2003 |
| WO | WO-2017180394 | A1 * | 10/2017 |
| WO | WO-2018056819 | A2 | 3/2018 |
| WO | WO-2018225426 | A1 * | 12/2018 ............. B60R 16/02 |

OTHER PUBLICATIONS

"Implementation of a safety system using ir and ultrasonic devices for mobility scooter obstacle collision avoidance," A. Bingham, et al., IEEE, May 28, 2014, 3 Pages.

First Office Action regarding Chinese Patent Application No. 202011395229.1, dated Dec. 31, 2021. Translation provided by Beijing ZBSD, 13 Pages.

Second Office Action regarding Chinese Patent Application No. 202011395229.1, dated Aug. 24, 2022. Translation provided by Beijing ZBSD.

\* cited by examiner

COLLISION ALERT SYSTEMS AND METHODS FOR MICROMOBILITY VEHICLES

CROSS REFERENCE TO RELATED APPLICATIONS

This application is a continuation of U.S. patent application Ser. No. 17/101,641 filed on Nov. 23, 2020. This application claims the benefit of U.S. Provisional Application No. 62/944,969, filed on Dec. 6, 2019, and of U.S. Provisional Application No. 63/000,086, filed on Mar. 26, 2020. The entire disclosures of each of the above applications are incorporated herein by reference.

FIELD

The present disclosure relates to collision alert systems and methods for micromobility vehicles.

BACKGROUND

This section provides background information related to the present disclosure which is not necessarily prior art.

Micromobility vehicles, such as electric scooters, powered bicycles, powered self-balancing boards and other small single person vehicles, are used for transportation in many cities. For example, a micromobility company can manage a fleet of micromobility vehicles for rent in a city via a server in communication with applications running on mobile devices of users who wish to rent one of the micromobility vehicles from the fleet. The increased use of micromobility vehicles within cities can beneficially reduce road traffic, pollution, and the use of fossil fuels for short distance travel within a city.

Unfortunately, the number of micromobility accidents and injuries connected to the use of micromobility vehicles is rising and presents an impediment to wider spread adoption of micromobility vehicles for transportation.

SUMMARY

This section provides a general summary of the disclosure, and is not a comprehensive disclosure of its full scope or all of its features.

The present disclosure includes a collision warning system for a micromobility vehicle that includes at least one proximity sensor mounted to the micromobility vehicle and configured to sense a distance to an object located in front of the micromobility vehicle, a speed sensor configured to sense a speed of the micromobility vehicle, at least one warning device, and a controller in communication with the at least one proximity sensor, the speed sensor, and the at least one warning device. The controller has a bypass mode and a warning mode and is configured to (i) receive the speed of the micromobility vehicle from the speed sensor, (ii) compare the speed of the micromobility vehicle with a predetermined speed threshold, (iii) enter the bypass mode in response to the speed of the micromobility vehicle being less than the predetermined speed threshold, and (iv) enter the warning mode in response to the speed of the micromobility vehicle being greater than the predetermined speed threshold. While in the bypass mode, the controller is further configured to not activate the at least one warning device. While in the warning mode, the controller is further configured to (v) receive the distance to the object from the at least one proximity sensor, (vi) determine a closing velocity to the object based on the speed of the micromobility vehicle received from the speed sensor, (vii) calculate an estimated time until a potential collision with the object based on the distance to the object and the closing velocity, (viii) compare the estimated time until the potential collision with the object with a predetermined time threshold, and (ix) generate a collision warning by activating the at least one warning device to alert a rider of the micromobility vehicle of the potential collision with the object in response to the estimated time until collision being less than the predetermined time threshold.

In other features, the at least one proximity sensor includes a LiDAR sensor.

In other features, the at least one proximity sensor includes at least one of a radar sensor, an ultrasonic sensor, and a camera.

In other features, the at least one warning device includes an audio device that generates an audible warning and a lighting device that generates a visual warning.

In other features, the controller is further configured to activate the at least one warning device at a plurality of intensity levels based on the estimated time until collision with the object.

In other features, the at least one warning device is configured to alert a non-rider of the micromobility vehicle of the collision of the potential collision with the object.

In other features, the controller is further configured to enter the bypass mode in response to the distance to the object being less than a predetermined distance threshold.

In other features, the at least one proximity sensor is a LiDAR sensor and the controller is further configured to receive a signal strength of a return signal received by the LiDAR sensor and set at least one of a blocked sensor flag and a defeated sensor flag based on the signal strength.

In other features, the at least one proximity sensor is a LiDAR sensor and the controller is further configured to (i) receive a signal strength of a return signal received by the LiDAR sensor, (ii) enter a demonstration mode in response to the signal strength indicating a first predetermined signal strength followed by a second predetermined signal strength. While in the demonstration mode, the controller is further configured to activate the at least one warning device in response to the distance to the object being less than a predetermined distance threshold.

In other features, the at least one proximity sensor includes a first sensor and a second sensor, the first sensor being a LiDAR sensor and the second sensor being one of an additional LiDAR sensor, a radar sensor, an ultrasonic sensor, and a camera, the first sensor and the second sensor being configured to have different detection cones relative to the micromobility vehicle.

In other features, the controller is configured to calculate the estimated time until the potential collision based on a reaction time factor in addition to the distance to the object and the closing velocity, the reaction time factor being based on a size of the micromobility vehicle.

In other features, the controller is further configured to, in response to the estimated time until collision being less than the predetermined time threshold, limit a maximum velocity of the micromobility vehicle.

In other features, the controller is further configured to limit the maximum velocity of the micromobility vehicle by replacing a desired throttle position input value with a maximum acceptable throttle position value that is calculated by the controller based on the estimated time until the potential collision, the maximum acceptable throttle position value corresponding to a maximum speed that is greater than a minimum speed necessary for the rider of the micromobility vehicle to maintain control of the micromobility vehicle.

In other features, the micromobility vehicle is a powered standing scooter.

The present disclosure also includes a collision/fall reporting system for an micromobility vehicle that includes at least one proximity sensor mounted to the micromobility vehicle and configured to sense a distance to an object located in front of the micromobility vehicle, a speed sensor configured to sense a speed of the micromobility vehicle, at least one tilt sensor configured to sense vertical orientation data of the micromobility vehicle indicating whether the micromobility vehicle is in an upright position or a horizontal position, a global positioning system configured to generate location data indicating a location of the micromobility vehicle, at least one warning device, a communication device configured to wirelessly communicate with at least one remote device from the micromobility vehicle, and a controller in communication with the at least one proximity sensor, the speed sensor, the at least one tilt sensor, the global positioning system, the at least one warning device, and the communication device. The controller is configured to (i) receive the distance to the object from the at least one proximity sensor, (ii) determine a closing velocity to the object based on the speed of the micromobility vehicle received from the speed sensor, (iii) calculate an estimated time until a potential collision with the object based on the distance to the object and the closing velocity, (iv) compare the estimated time until the potential collision with the object with a predetermined time threshold, (v) generate a collision warning by activating the at least one warning device to alert a rider of the micromobility vehicle of the potential collision with the object in response to the estimated time until collision being less than the predetermined time threshold, (vi) receive the vertical orientation data of the micromobility vehicle from the at least one tilt sensor, (vii) determine that a collision has occurred in response to the collision warning being generated while the speed of the micromobility vehicle was greater than a predetermined speed threshold, followed by the vertical orientation data indicating that the micromobility vehicle is in the horizontal position after the collision warning was generated, (viii) receive the location data from the global positioning system, (ix) determine a time of the collision, and (x) communicate, using the communication device, a collision alert to the at least one remote device in response to determining that the collision has occurred, the collision alert including the location of the micromobility vehicle and the time of the collision.

In other features, the at least one remote device is a server accessible to a lessor of the micromobility vehicle, the micromobility vehicle being in a fleet of a plurality of micromobility vehicles leased by the lessor.

In other features, the at least one remote device is part of an emergency response system.

In other features, the controller is further configured to determine that a fall has occurred in response to the vertical orientation data indicating that the micromobility vehicle is in the horizontal position, without any collision warning being generated, to determine a time of the fall, and to communicate, using the communication device, a fall alert to the at least one remote device in response to determining that the fall has occurred, the fall alert including the location of the micromobility vehicle and the time of the fall.

In other features, the at least one tilt sensor includes a first tilt sensor and a second tilt sensor and, in response to determining that the collision has occurred, the controller is further configured to determine whether both of the first tilt sensor and the second tilt sensor have been activated, determine a severity of the collision based on whether both of the first tilt sensor and the second tilt sensor have been activated, and to communicate, using the communication device, the determined severity of the collision to the at least one remote device.

In other features, the controller is further configured to: determine that the severity of the collision corresponds to a first severity level in response to determining that both of the first tilt sensor and the second tilt sensor have been activated, and determine that the severity of the collision corresponds to a second severity level in response to determining that only one of the first tilt sensor or the second tilt sensor have been activated, the first severity level being higher than the second severity level.

In other features, in response to determining that the collision has occurred, the controller is further configured to determine a severity of the collision based on the closing velocity of the micromobility vehicle at the time of the collision and to communicate, using the communication device, the determined severity of the collision to the at least one remote device.

In other features, the controller is further configured to: compare the closing velocity of the micromobility vehicle at the time of the collision with a predetermined collision speed threshold; determine that the severity of the collision corresponds to a first severity level in response to the closing velocity of the micromobility vehicle at the time of the collision being greater than the predetermined collision speed threshold; and determine that the severity of the collision corresponds to a second severity level in response to the closing velocity of the micromobility vehicle at the time of the collision being less than the predetermined collision speed threshold.

In other features, the micromobility vehicle is a powered standing scooter.

The present disclosure is also directed to a downed micromobility vehicle notification system for an micromobility vehicle that includes a speed sensor configured to sense a speed of the micromobility vehicle, a tilt sensor configured to sense vertical orientation data of the micromobility vehicle indicating whether the micromobility vehicle is in an upright position or a horizontal position, at least one notification device, and a controller in communication with the speed sensor, the tilt sensor, and the at least one notification device. The controller is configured to (i) receive the speed of the micromobility vehicle from the speed sensor, (ii) receive the vertical orientation data of the micromobility vehicle from the tilt sensor, and (iii) generate a downed micromobility vehicle notification by activating the at least one notification device in response to the speed of the micromobility vehicle indicating that the micromobility vehicle is not moving and the vertical orientation data indicating that the micromobility vehicle is in the horizontal position.

In other features, wherein the at least one notification device includes at least one of a visual device that generates a visual notification and an audio device that generates an audible notification.

In other features, the controller is further configured to deactivate the at least one notification device in response to the vertical orientation data indicating that the micromobility vehicle has been returned to the upright position.

In other features, a global positioning system is configured to generate location data indicating a location of the micromobility vehicle and a communication device is configured to wirelessly communicate with at least one remote device from the micromobility vehicle. The controller is in communication with the global positioning system and the communication device and is further configured to (iv) receive the location data from the global positioning system, and (v) communicate, using the communication device, a downed micromobility vehicle alert to the at least one remote device in response to the speed of the micromobility vehicle indicating that the micromobility vehicle is not moving and the vertical orientation data indicating that the micromobility vehicle is in the horizontal position, the downed micromobility vehicle alert including the location of the micromobility vehicle.

In other features, the at least one remote device is a server accessible to a lessor of the micromobility vehicle, the micromobility vehicle being in a fleet of a plurality of micromobility vehicles leased by the lessor.

In other features, the controller is further configured to determine whether a drive system for the micromobility vehicle is powered on based on a power signal from the drive system and to generate the downed micromobility vehicle notification only when the micromobility vehicle is not powered on.

In other features, the micromobility vehicle is a powered standing scooter.

In other features, the present disclosure includes a collision warning system for a micromobility vehicle that includes at least one proximity sensor mounted to the micromobility vehicle, directed towards terrain in front of the micromobility vehicle, and configured to sense a current distance to the terrain in front of the micromobility vehicle, the terrain including at least one of a surface upon which the micromobility vehicle will be traveling and an object in front of the micromobility vehicle, a speed sensor configured to sense a speed of the micromobility vehicle, at least one warning device, and a controller in communication with the at least one proximity sensor, the speed sensor, and the at least one warning device. The controller is configured to (i) receive the current distance from the at least one proximity sensor, (ii) determine a baseline distance by averaging the current distance over a predetermined time period, (iii) determine a difference between the current distance and the baseline distance, (iv) determine a rate at which the difference is changing, (v) determine an anticipated vertical acceleration of the micromobility vehicle based on the rate at which the difference is changing, (vi) receive the speed of the micromobility vehicle from the speed sensor, (vii) determine a maximum allowable vertical acceleration of the micromobility vehicle based on the speed of the micromobility vehicle, (viii) compare the anticipated vertical acceleration of the micromobility vehicle with the maximum allowable vertical acceleration of the micromobility vehicle, and (ix) generate a collision warning by activating the at least one warning device to alert a rider of the micromobility vehicle of a potential collision in response to the anticipated vertical acceleration being greater than the maximum allowable vertical acceleration.

In other features, the controller is further configured to set the maximum allowable vertical acceleration to a first value based on the speed of the micromobility vehicle in response to the rate at which the difference is changing being a negative rate and to set the maximum allowable vertical acceleration to a second value based on the speed of the micromobility vehicle in response to the rate at which the difference is changing being a positive rate, the first value being different from the second value. The negative rate corresponds to the potential collision being with an in ground hazard and the positive rate corresponds to the potential collision being with an above ground hazard.

In other features, the at least one proximity sensor is mounted to the micromobility vehicle with an adjustable tilt device and wherein the controller is further configured to control the adjustable tilt device based on the speed of the micromobility vehicle to adjust a measurement angle of the at least one proximity sensor relative to the terrain.

In other features, the controller is further configured to increase the measurement angle as the speed of the micromobility vehicle increases to measure the current distance to the terrain that is further away from the micromobility vehicle and to decrease the measurement angle as the speed of the micromobility vehicle decreases to measure the current distance to the terrain that is closer to the micromobility vehicle.

In other features, the micromobility vehicle is a powered standing scooter.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
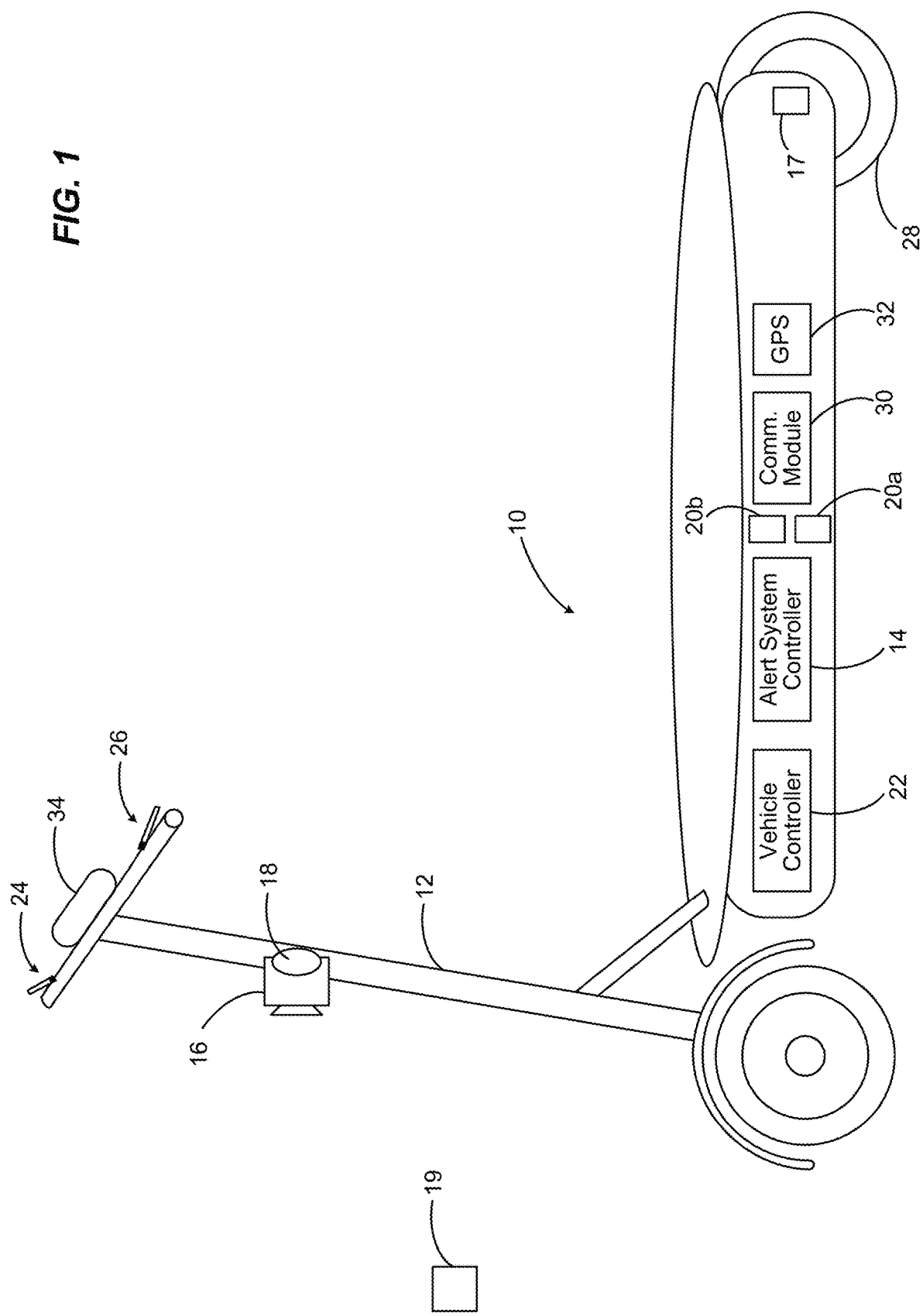
FIG. 1 is a functional block diagram of a collision alert system for a micromobility vehicle according to the present disclosure.

This patent application is submitted by the GEKOT (Great Engineering Kids of Tomorrow) Robotics Team from East Hills Middle School in Bloomfield Hills, Mich.

Example embodiments will now be described more fully with reference to the accompanying drawings.

The present disclosure is directed to collision alert systems and methods for micromobility vehicles. The term "micromobility vehicles" refers to the class of vehicles defined as "powered micromobility vehicles" in the SAE J3194 standard, published Nov. 20, 2019, which uses the term "powered micromobility vehicle" to describe the class of vehicles that (i) are partially or fully powered by a motor/engine (i.e., excludes solely human powered vehicles like pedal-only bikes); (ii) have a top speed of no greater than 30 miles per hour (48 kilometers per hour); and (iii) have a curb weight of no greater than 500 pounds (227 kilograms). In this way, micromobility vehicles refer to vehicles that are powered, relatively slow, and lightweight. The SAE J3194 standard notes six distinct types of micromobility vehicles, including powered bicycles, powered standing scooters, powered seated scooters, powered self-balancing boards, powered non-self-balancing boards, and powered skates. The collision alert systems and methods described in the present disclosure are for these micromobility vehicles.

The collision alert systems and methods for micromobility vehicles of the present disclosure utilize a variety of sensors and controls to detect and alert users of the micromobility vehicle and nearby pedestrians of potential hazards so that the users and nearby pedestrians can take action to avoid an accident. For example, the collision alert systems and methods for micromobility vehicles of the present disclosure utilize one or more proximity sensors to detect an object in the travel direction of the micromobility vehicle and then determine whether the object presents a risk of collision. More specifically, the collision alert systems and methods for micromobility vehicles of the present disclosure calculate a time to collision with the object based on the distance to the object detected by the proximity sensor and based on the closing velocity of the micromobility vehicle based on a speed sensor. When the time to collision is less than a predetermined time, one or more alerts, such as audio, visual, and/or haptic alerts, are generated to alert the user of the micromobility vehicle and/or any nearby pedestrians of the potential hazard and potential collision with the detected object. The collision alert systems and methods for micromobility vehicles of the present disclosure also utilize tilt sensors to detect when a collision or fall has occurred after an alert has been generated. In such case, a notification and alert that a collision or fall has occurred can be generated and transmitted to a remote device, such as server operated by an owner/lessor of the fleet of micromobility vehicles and/or an emergency response system, as described in further detail below. The collision alert systems and methods for micromobility vehicles of the present disclosure can also detect when a micromobility vehicle has been left lying on the ground, such as in a horizontal position as opposed to a vertical upright position, and can generate a visual alert along with an alert that is transmitted to the server operated by the owner/lessor of the fleet of micromobility vehicles indicating that the micromobility vehicle has been left in the horizontal position, as discussed in further detail below.

With reference to FIG. 1, a collision alert system 10 for a micromobility vehicle 12 is shown. Specifically, the micromobility vehicle 12 is illustrated in FIG. 1 as an electrically powered standing scooter. While an electrically powered standing scooter is shown in the example of FIG. 1, the collision alert systems and methods of the present disclosure can be used with any micromobility vehicle.

The collision alert system 10 includes an alert system controller 14, a proximity sensor 16, a speed sensor 17, and tilt sensors 20a and 20b. The alert system controller 14 is in communication with a vehicle controller 22 that controls operation of the micromobility vehicle 12 based on user input from, for example, a throttle device 24 and brake device 26. The vehicle controller 22, for example, can control the speed of an electric motor that drives a wheel 28 of the micromobility vehicle 12. The alert system controller 14 is also in communication with a communication module 30 used to communicate alerts and notifications to a remote device, such as a server 100 over a network 104 (shown in FIG. 2). The alert system controller 14 is also in communication with a global positioning system (GPS) 32 that determines a location of the micromobility vehicle 12 based on signals received from GPS satellites.

The speed sensor 17 can detect a speed of the micromobility vehicle 12 based on a rotational speed of the wheel 28 of the micromobility vehicle 12, for example. The tilt sensors 20a and 20b detect whether the micromobility vehicle 12 is upright and vertical, or whether the micromobility vehicle 12 is lying horizontal on a left side or a right side of the micromobility vehicle 12. The tilt sensors 20a and 20b can include accelerometers positioned to sense whether the micromobility vehicle is upright, lying on a left side, or lying on a right side of the micromobility vehicle.

The collision alert system 10 also includes one or more warning devices 34. The warning devices 34, for example, can include a speaker that outputs an audible alert, a light (such as an LED light) that outputs a visual alert, and/or a vibration mechanism that outputs a haptic alert. The alert system controller 14 controls the one or more warning devices 34 to alert the user of the micromobility vehicle 12 and/or nearby pedestrians of a possible hazard or potential collision.

The proximity sensor 16 senses a distance to an object 19 in front of, i.e., in the travel direction of, the micromobility vehicle 12, and communicates the distance to the alert system controller 14. While a single proximity sensor 16 is shown in FIG. 1, any number of additional proximity sensors 16 can be used. The proximity sensor 16, for example, can be implemented with a Light Detection and Ranging (LiDAR) sensor. Additionally or alternatively, the proximity sensor 16 can be implemented by a radar sensor, an ultrasonic sensor, an image sensor (such as a camera) and/or any other sensor that can be utilized to detect a distance to an object within a detection range of the sensor.

In some embodiments, multiple proximity sensors 16 having different types can be used in the collision alert system 10. For example, a LiDAR sensor can be used as a first proximity sensor 16 having a first range and/or detection cone. An additional sensor having a different type, such as a radar sensor, ultrasonic sensor, or image sensor can be used as a second proximity sensor 16 having a second range and/or detection cone. In such case, both proximity sensors 16 can detect distances to an object in the travel direction of the micromobility vehicle 12 and communicate the distances to the alert system controller 14, which can determine a distance to an object, and/or to multiple objects, based on the data received from both sensors.

In addition, while a front facing proximity sensor 16 is shown in FIG. 1 and used to detect an object 19 in a travel direction of the micromobility vehicle 12, in other embodiments side facing proximity sensors can be used to detect distances to objects that are located to the side of the micromobility vehicle 12, i.e., in a direction perpendicular to the direction of travel of the micromobility vehicle 12. In some embodiments, the proximity sensor 16 can include a tilt device 18 used by the alert system controller 14 to control a measurement angle of the proximity sensor 16, as described in further detail below.

Figure 2:
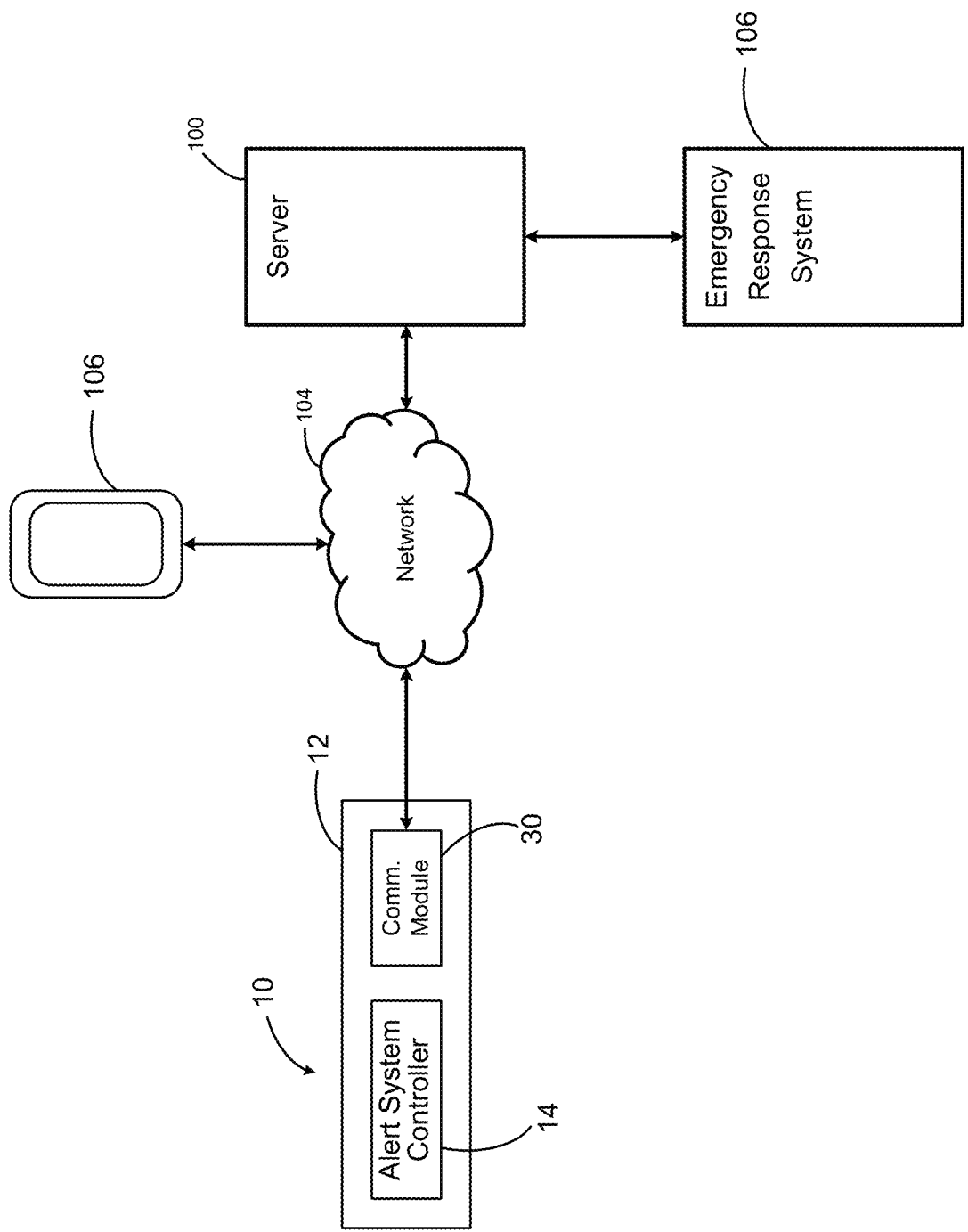
FIG. 2 is a functional block diagram of a collision alert system for a micromobility vehicle in communication with a server, a mobile device, and emergency response system according to the present disclosure.

With reference to FIG. 2, the collision alert system 10 and micromobility vehicle 12 are shown with the alert system controller 14 and communication module 30. The communication module is in communication with a server 100 over a network 104, such as the Internet. Alternatively, the network could be a local area network (LAN) or another wide area network (WAN). As discussed in further detail below, the alert system controller 14 can communicate various alerts and notifications, including notifications indicating that a collision has occurred, that the micromobility vehicle 12 has fallen, that the micromobility vehicle 12 has been left horizontal on the ground, etc. The server 100, in turn, can notify an emergency response system 108, such as a local 911 system, that a collision has occurred. Additionally or alternatively, the alert system controller 14 can be configured to communicate directly with the emergency response system 108 that a collision has occurred, for example. Additionally, the alert system controller 14 and the server 100 can also communicate with a mobile device 106 of a user over the network 104 to provide the alerts to a user.

Figure 3:
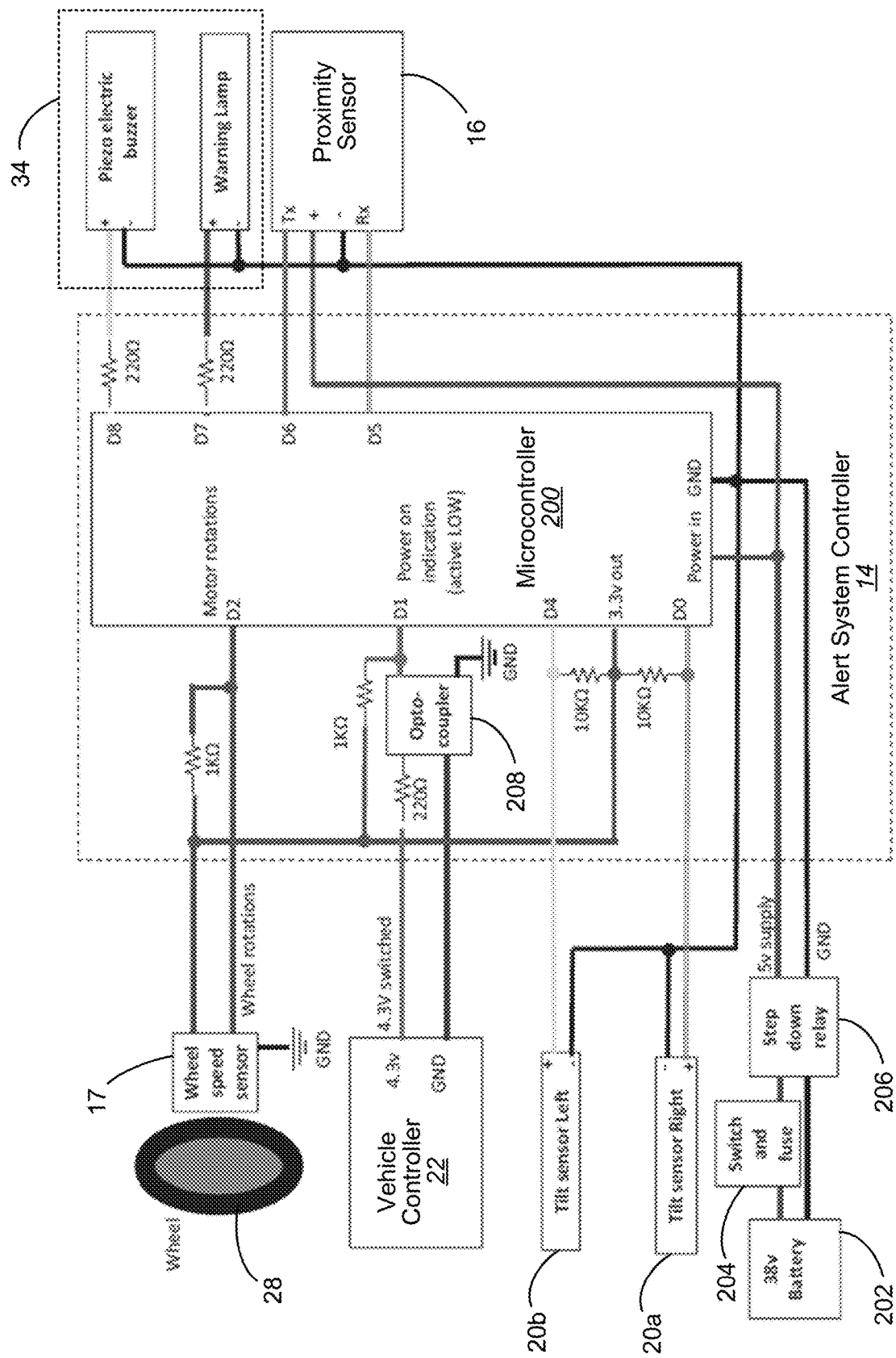
FIG. 3 is a schematic for a collision alert system for a micromobility vehicle according to the present disclosure.
Figure 4:
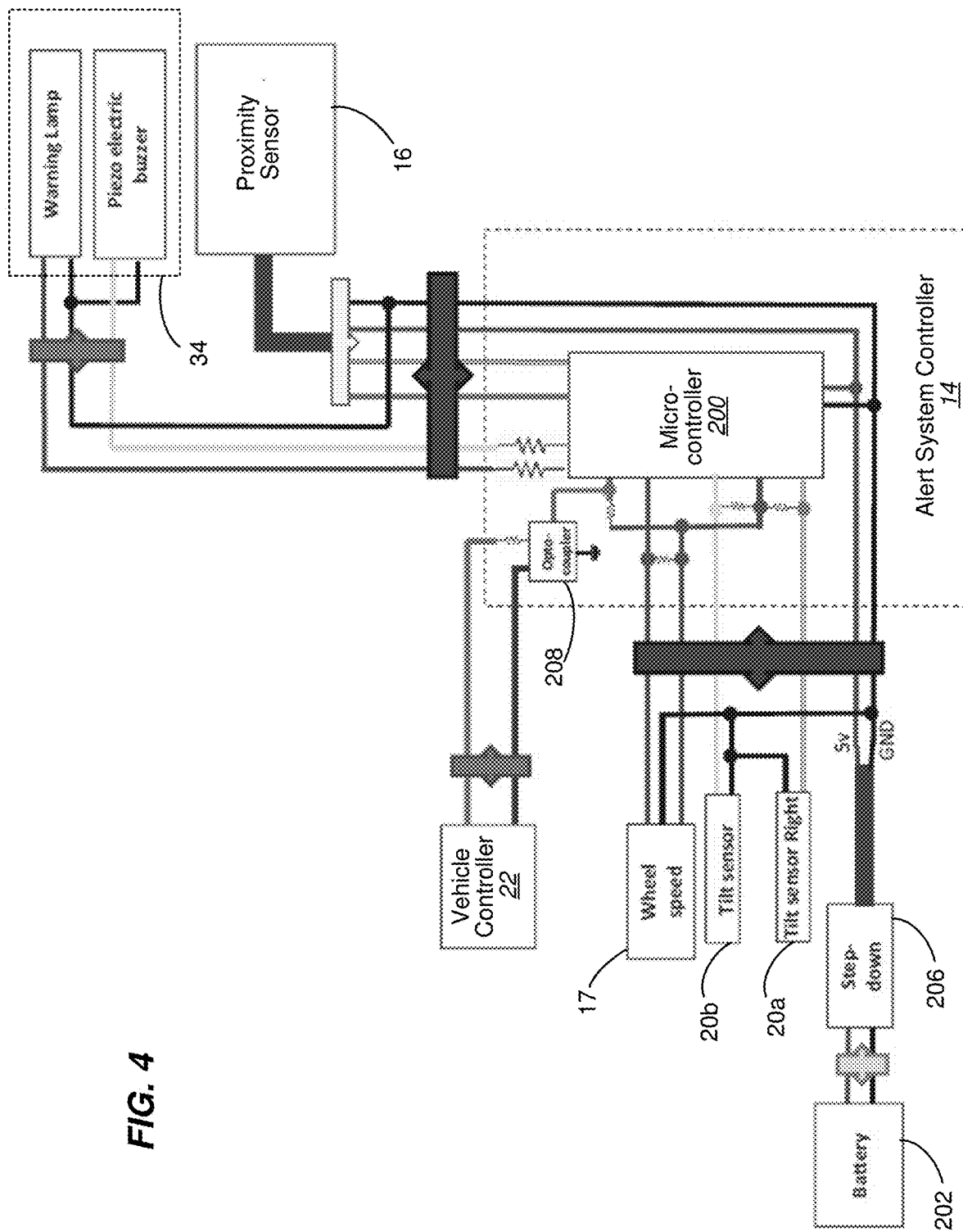
FIG. 4 is a schematic illustrating a wire harness for a collision alert system for a micromobility vehicle according to the present disclosure.

With reference to FIG. 3 and FIG. 4, schematics for a collision alert system 10 for a micromobility vehicle 12 according to the present disclosure is shown. The schematic of FIG. 3, for example, illustrates a microcontroller 200 of the alert system controller 14 with specific input and output pins. The schematic of FIG. 4 illustrates wire harness connections to and from the alert system controller 14.

With continued reference to FIG. 3 and FIG. 4, the microcontroller 200 can be implemented, for example, by an Arduino microcontroller, although any other microcontroller or other suitable printed circuit board, processor, or module programmed to perform the described functionality can be used. The microcontroller 200 also includes memory storing computer executable instructions to perform the described functionality. As shown in FIG. 3, the microcontroller includes pins labelled D0 to D2 and D4 to D8, with pins D0 to D2, D4, and D6 being used for input and pins D5, D7, and D8 being used for output. The microcontroller 200 also includes a "Power in" pin to receive electrical power and a ground pin "GND" for a connection to ground. The microcontroller 200 also includes memory storing computer executable instructions to perform the described functionality.

The microcontroller 200 is connected to, and receives electrical power from, a battery 202 through a switch and fuse 204 and a step down relay 206. As shown in FIG. 3, the battery 202 can be a 38 volt battery that powers the micromobility vehicle 12. The switch and fuse 204 can be used to switch the microcontroller on and off. The step down relay 206 can be used to step down or reduce the voltage from the 38 volts supplied by the battery to 5 volts, as used to power the microcontroller 200.

The microcontroller 200 is connected to the vehicle controller 22 through opto-coupler 208 via the D1 pin. The input at the D1 input put indicates whether the vehicle controller 22 is powered on and in a operable state to power and control the micromobility vehicle 12. In other words, the input at the D1 input pin indicates whether the micromobility vehicle 12 is powered on.

The input at the D2 pin is connected to the speed sensor 17 and indicates the wheel rotations of the wheel 28 as detected by the speed sensor 17. Based on the detected wheel rotations and the known size of the wheel 28 stored in memory, the microcontroller 200 can calculate the current speed of the micromobility vehicle 12. The microcontroller 200 includes a 3.3 volt output pin (located between pins D0 and D4) that powers the speed sensor 17.

The microcontroller 200 recites input from the left and right tilt sensors 20a and 20b at pins D0 and D4. The input at these pins indicates whether the corresponding tilt sensor has been triggered. For example, sufficiently tilting the micromobility vehicle 12 to the right side can trigger the right tilt sensor 20a and sufficiently tilting the micromobility vehicle 12 to the left side can trigger the left tilt sensor 20b.

The microcontroller 200 communicates with the proximity sensor 16 via pins D5 and D6. For example, the microcontroller receives data from the proximity sensor 16 via pin D6 and transmits data to the proximity sensor 16 via pin D5. If the proximity sensor 16 is a LiDAR sensor, for example, the microcontroller 200 can receive data indicating a distance from the proximity sensor 16 to an object 19 based on a laser signal that is transmitted by the LiDAR sensor. The signal bounces off of the object and is received by the LiDAR sensor. Based on the reflected or return signal received by the LiDAR sensor, the LiDAR sensor can generate data indicating a distance to the object 19 and a signal strength of the reflected or return signal. The data indicating the distance to the object 19 and the signal strength of the reflected or return signal is communicated from the LiDAR sensor to the microcontroller 200 via pin D6.

The microcontroller 200 controls the warning devices 34 via pins D7 and D8. For example, as shown in FIG. 3 and FIG. 4, the warning devices 34 can include a piezo electric buzzer that generates audio and/or haptic output and a warning lamp that generates visual output. The microcontroller 200 can activate the piezo electric buzzer via pin D8 and can activate the warning lamp via pin D7.

Figure 5:
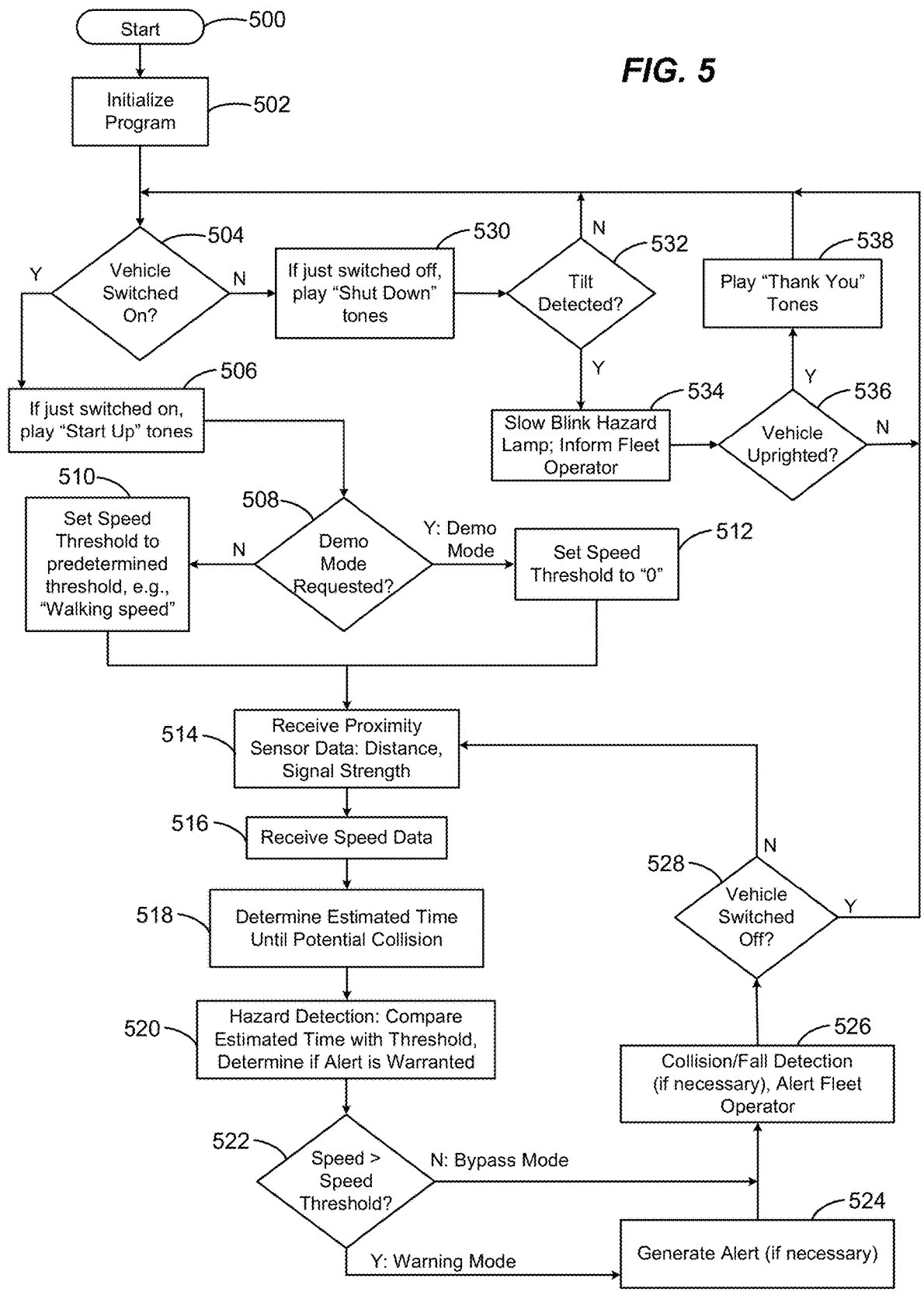
FIG. 5 is a flow diagram for a collision alert method for a micromobility vehicle according to the present disclosure.

With reference to FIG. 5, a flow diagram for a collision alert method for a micromobility vehicle according to the present disclosure is shown. The method can be performed, for example, by the alert system controller 14 based on computer executable instructions stored in a computer readable medium of the alert system controller 14. The method starts at 500.

At 502, the alert system controller 14 initializes the program by booting up, loading, and initializing the executable software for the collision alert method. At 504, the alert system controller 14 determines whether the micromobility vehicle 12 is switched on. As discussed above with reference to FIG. 3 and FIG. 4, the alert system controller 14 determines whether the "Power On" signal is being received from the vehicle controller 22. For example, the "Power On" signal can be received at pin D1 of the microcontroller 200 and indicates that the micromobility vehicle 12 is switched on and ready for use.

At 506, the alert system controller 14 determines whether the micromobility vehicle 12 was recently switched on. If the micromobility vehicle 12 was recently switched on, the alert system controller 14 can play "Start Up" tones to indicate that the system is turning on. For example, the alert system controller 14 can keep track of when the "Power On" signal from the vehicle controller 22 changes from a state of indicating that the micromobility vehicle 12 is off to a state of indicating that the micromobility vehicle 12 is on. In such case, when the "Power On" signal changes from off to on, the alert system controller 14 can play the "Start Up" tones at 506.

At 508, the alert system controller 14 determines whether a demonstration mode is being requested. For example, if a LiDAR sensor is used as the proximity sensor 16, the LiDAR sensor returns both a distance to an object and an intensity of a signal that is reflected off of the object. As such, different intensities are returned based on the color of the object. The demonstration mode can be triggered by flashing a series of colors in front of the LiDAR sensor within a predetermined time period. For example, the demonstration mode can be triggered by using a card that is black on one side and white on the other side. The black side of the card can be placed in front of the LiDAR sensor, followed by the white side of the car, within a predetermined time period, such as 4 seconds. At 508, the alert system controller 14 analyzes the intensities of the signals sensed by the LiDAR sensor and determines whether they meet the designated pattern indicating a request for the demonstration mode. While a black and a white card are used in this example, other color combinations displayed to the LiDAR sensor in a predetermined pattern can also be used to trigger the demonstration mode.

At 508, when the demonstration mode is not requested, the alert system controller proceeds to 510 and sets the speed threshold to a predetermined speed threshold, such as a walking speed. For example, the speed threshold may be set to correspond to a walking speed of 3 miles per hour or 134 centimeters per second. Other predetermined speed threshold levels, however, can be used. As discussed in further detail below, the speed threshold is used to suppress the generation of alerts to the user when the speed of the micromobility is below the set speed threshold.

At 508, when the demonstration is requested, the speed threshold is set to 0. In this way, in the demonstration mode, alerts are not suppressed based on the vehicle having a low speed. As such, the demonstration mode can be used to demonstrate the functionality of the collision alert system 10 without having to drive the micromobility vehicle 12 at a speed greater than the speed threshold. Specifically, in the demonstration mode, the collision alert system 10 generates alerts based on the distance to objects even when the micromobility vehicle is moving very slowly. After setting the speed threshold at 510 or 512, the alert system controller proceeds to 514.

At 514, the alert system controller 14 receives proximity sensor data from the proximity sensor 16, including the distance to an object in front of the micromobility vehicle 12. In addition, if the proximity sensor 16 is a LiDAR sensor, the proximity sensor data can also include the signal strength of the reflected signal off of the object.

At 516, the alert system controller 14 receives speed data from the speed sensor 17. As discussed above, the alert system controller 14 can receive data indicating the number of wheel rotations of the wheel 28 of the micromobility vehicle 12 and can determine the speed of the micromobility vehicle 12 based on the number of wheel rotations and the known size of the wheel 28.

At 518, the alert system controller 14 determines a closing velocity to the detected object 19 based on the speed of the micromobility vehicle 12 detected by the speed sensor 17. The alert system controller 14 can also determine a relative speed of the micromobility vehicle 12 relative to the object 19, in the event the object 19 is moving, based on the speed detected by the speed sensor 17 and the data from the proximity sensor 16. The alert system controller 14 then calculates an estimated time until a potential collision with the object 19 based on the distance to the object and the closing velocity of the micromobility vehicle 12 to the object 19. Additionally, the alert system controller 14 can use a reaction time factor to determine and/or adjust the estimated time until the potential collision. The reaction time factor, for example, can be based on a known size of the micromobility vehicle 12, such that larger/heavier micromobility vehicles 12 have a reaction time factor that reduces the estimated time until the potential collision while smaller/lighter micromobility vehicles 12 have a reaction time factor that increases the estimated time until the potential collision.

At 520, the alert system controller 14 performs hazard detection by comparing the estimated time until the potential collision with a predetermined time threshold. The predetermined time threshold may be the same for all speeds, such as a matter of 3 or 4 seconds. Additionally or alternatively, the predetermined time threshold can be adjusted based on factors such as the speed of the micromobility vehicle 12 such that the predetermined time threshold is reduced as the speed of the micromobility vehicle 12 increases. The predetermined time threshold can also be adjusted based on the size or weight of the micromobility vehicle 12.

At 522, the alert system controller 14 compares the current speed of the micromobility vehicle, as detected by the speed sensor 17, with the speed threshold set at 510 and 512, as discussed above. When the speed is greater than the speed threshold the alert system controller 14 enters a warning mode and proceeds to 524 and generates an alert, if necessary. While in the warning mode, the alert system controller 14 generates alerts and notifications, as necessary, to alert the user of the micromobility vehicle to potential hazards or collisions. When the speed is not greater than the speed threshold, the alert system controller enters a bypass mode whereby alerts are suppressed. In this way, the collision alert system 10 and the alert system controller 14 enter the bypass mode when the speed of the micromobility vehicle 12 is less than the speed threshold. While in the bypass mode the alert system controller 14 does not generate collision alerts to the user. For example, the user of the micromobility vehicle 12 may be stopped at a cross walk and not moving, or moving at a very slow speed less than a walking speed. In such case, since the user is not moving or is moving very slowly, the user does not need to be alerted to collisions with objects ahead of the micromobility vehicle 12 and the generation of false positive collision alerts while the user is stopped or moving very slowly can be annoying or disturbing to the user. As such, while in the bypass mode, the alert system controller 14 suppresses the generation of alerts, bypasses 524, and proceeds directly to 526.

In addition, as discussed above, when in the demonstration mode, the speed threshold is set to 0. As such, when in the demonstration mode with a speed threshold of 0, the alert system will always enter the warning mode (Y at 522) and proceed to 524 to generate alerts as necessary.

At 524, the alert system controller 14 generates an alert, if necessary, based on the comparison of the estimated time until the potential collision with the predetermined time threshold. For example, when the estimated time until the potential collision is less than the predetermined time threshold, the alert system controller 14 generates an alert by activating the one or more warning devices 34. The alert system controller 14 can also utilize more than one level of warning based on the speed of the micromobility vehicle 12 and/or the estimated time until the potential collision. For example, the alert system controller 14 can use multiple levels of intensity for the alerts based on the anticipated severity of the potential collision. Higher speeds of the micromobility vehicle and/or lower estimated times until the potential collision may correspond to higher levels of alert intensity, while lower speeds and greater estimated times until the potential collision may correspond to lower levels of alert intensity. In this way, the alert system controller 14 can be configured to activate the one or more warning devices 34 at multiple intensity levels based on the estimated time until collision with the object 19. The alerts generated by the one or more warning devices 34 can also alert a non-rider of the micromobility vehicle 12, e.g., a nearby pedestrian in the vicinity of the micromobility vehicle 12, of the collision of the potential collision with the object.

In addition to generating the alert at 524, when a potential collision is detected the alert system controller 14 can also limit a maximum velocity of the micromobility vehicle 12. For example, the alert system controller 14 can calculate a maximum acceptable throttle position value calculated by the alert system controller 14 based on the estimated time until the potential collision and then replace a current desired throttle position input value, indicated by the throttle device 24, with the maximum acceptable throttle position value when the current desired throttle position input value is greater than the calculated maximum acceptable throttle position value.

At 526, the alert system controller 14 performs collision/fall detection. For example, the alert system controller 14 receives vertical orientation data from the tilt sensors 20a and 20b and determines whether the micromobility vehicle 12 is in upright position or a horizontal position. When the micromobility vehicle 12 is determined to be in a horizontal position immediately after a collision alert was generated, the alert system controller 14 generates an alert indicating that a collision has occurred. In addition, when the micromobility vehicle 12 is determined to be in a horizontal position immediately after traveling at a speed above a predetermined threshold without a collision alert being generated, the alert system controller 14 generates an alert indicating that a fall has occurred. The alert system controller 14 can use the communication module 30 to communicate the collision or fall alert to the server 100 (shown in FIG. 2) associated with or accessible to an owner/lessor of the micromobility vehicle 12. For example, the server 100 can be operated by and/or accessible to an entity that operates a fleet of micromobility vehicles, including the micromobility vehicle 12. The alert can include a location of the micromobility vehicle 12, as determined by the GPS 32. The alert can also include the time that the collision or fall was detected.

The alert system controller 14 can also determine a severity of the collision or fall based on the speed of the micromobility vehicle 12 at the time of the collision and based on whether one or both tilt sensors 20a and 20b have been activated. Higher speeds correspond can correspond to a higher potential severity of the collision or fall. For example, the speed of the micromobility vehicle 12 being greater than a predetermined or calibrated speed threshold can indicated a higher potential severity of the collision or fall. In addition, both tilt sensors 20a and 20b being activated within a predetermined or calibrated time period also corresponds to a higher potential severity of the collision or fall. The alert system controller 14 can include the potential severity of the collision or fall in the generated alert that is transmitted to the server 100. The server 100, in turn, can communicate information about the collision to an emergency response system 108, such as a community 911 emergency response system. Additionally or alternatively, the alert system controller 14 and the communication module 30 can communicate the collision alert directed to the emergency response system 108.

At 528, the alert system controller 14 determines whether the micromobility vehicle 12 has been switched off. When the micromobility vehicle 12 has not been switched off, the alert system controller 14 loops based to 514 and receives proximity data from the proximity sensor, as described above. At 528, when the micromobility vehicle 12 has been switched off, the alert system controller 14 loops back to 504.

At 504, when the alert system controller 14 determines that the micromobility vehicle 12 is not switched on, i.e., the micromobility vehicle 12 has been switched off, the alert system controller 14 proceeds to 530 and determines whether the micromobility vehicle has recently been switched off. If the micromobility vehicle 12 was recently switched off, the alert system controller 14 can play "Shut Down" tones to indicate that the system is turning off. For example, the alert system controller 14 can keep track of when the "Power On" signal from the vehicle controller 22 changes from a state of indicating that the micromobility vehicle 12 is on to a state of indicating that the micromobility vehicle 12 is off. In such case, when the "Power On" signal changes from on to off, the alert system controller 14 can play the "Shut Down" tones at 530.

At 532, the alert system controller 14 receives vertical orientation data from the tilt sensors 20a and 20b and determines whether the micromobility vehicle 12 is in an upright position or a horizontal position. When a tilt is not detected and the micromobility vehicle 12 is in the upright position, the alert system controller 14 loops back to 504. At 532, when a tilt is detected and the tilt sensors 20a and 20b indicate that the micromobility vehicle 12 is in a horizontal position, the alert system controller 14 proceeds to 534 and activates the one or more warning devices 34 to indicate that the micromobility vehicle 12 is not in an upright position. For example, the alert system controller 14 can control the one or more warning devices 34 to slowing blink a hazard lamp of the one or more warning devices 34 to indicate to passersby that the micromobility vehicle 12 is in a horizontal position and needs to uprighted.

At 536, the alert system controller 14 determines whether the micromobility vehicle has been uprighted based on the vertical orientation data received from the tilt sensors 20a and 20b. At 536, when the micromobility vehicle 12 has not been uprighted, the alert system controller 14 loops back to 504. At 536, when the alert system controller 14 determines that the micromobility vehicle 12 has been uprighted, the alert system controller proceeds to 538 and plays "Thank You" tones to thank the passerby for uprighting the micromobility vehicle 12. The alert system controller 14 then loops back to 504.

In this way, the present disclosure includes an alert system controller 14 in communication with the proximity sensor 16, speed sensor 17, and the one or more warning devices 34 that is configured to operate in a bypass mode and in a warning mode. As discussed above, the alert system controller 14 is configured to (i) receive the speed of the micromobility vehicle 12 from the speed sensor 17, (ii) compare the speed of the micromobility vehicle 12 with a predetermined speed threshold, (iii) enter the bypass mode in response to the speed of the micromobility vehicle being less than the predetermined speed threshold, and (iv) enter the warning mode in response to the speed of the micromobility vehicle being greater than the predetermined speed threshold. While in the bypass mode, the alert system controller is further configured to not activate the at least one warning device. While in the warning mode, the alert system controller 14 is further configured to (v) receive a distance to an object 19 from the proximity sensor 16, (vi) determine a closing velocity to the object 19 based on the speed of the micromobility vehicle 12 received from the speed sensor 17, (vii) calculate an estimated time until a potential collision with the object 19 based on the distance to the object 19 and the closing velocity, (viii) compare the estimated time until the potential collision with the object 19 with a predetermined time threshold, and (ix) generate a collision warning by activating the one or more warning devices 34 to alert a rider of the micromobility vehicle of the potential collision with the object 19 in response to the estimated time until collision being less than the predetermined time threshold.

The alert system controller 14 can also be configured to detect when the proximity sensor 16 has been blocked and/or defeated. For example, a user of the micromobility vehicle 12 may place an object, such as an article of clothing, on the micromobility vehicle 12 in such a way that the proximity sensor 16 is covered up by the proximity sensor 16. In such case, the alert system controller 14 can detect that an object is extremely close to the proximity sensor 16. For example, the alert system controller can utilize a blocked/defeated distance threshold and compare the distance to a detected object to the blocked/defeated distance threshold. The blocked/defeated distance threshold, for example, may be less than 10 centimeters. When the alert system controller 14 detects that the distance to an object 19 is less than the predetermined blocked/defeated distance threshold, the alert system controller 14 can be configured to enter the bypass mode and refrain from generating alerts. In addition, when the proximity sensor 16 is a LiDAR sensor, the alert system controller 14 can be further configured to receive a signal strength of a return signal received by the LiDAR sensor and set at least one of a blocked sensor flag and a defeated sensor flag based on the signal strength. A technician, for example, can later communicate with the alert system controller 14 to determine that the blocked sensor flag or the defeated sensor flag was set and reset the alert system controller 14, as necessary.

The present disclosure also includes a collision/fall reporting system whereby the alert system controller 14 is configured to (i) receive the distance to the object 19 from the proximity sensor 16, (ii) determine a closing velocity to the object 19 based on the speed of the micromobility vehicle 12 received from the speed sensor 17, (iii) calculate an estimated time until a potential collision with the object 19 based on the distance to the object 19 and the closing velocity, (iv) compare the estimated time until the potential collision with the object 19 with a predetermined time threshold, (v) generate a collision warning by activating one or more warning device 34 to alert a rider of the micromobility vehicle 12 of the potential collision with the object 19 in response to the estimated time until collision being less than the predetermined time threshold, (vi) receive vertical orientation data of the micromobility vehicle 12 from one or more tilt sensors 20a and 20b, (vii) determine that a collision has occurred in response to the collision warning being generated while the speed of the micromobility vehicle 12 was greater than a predetermined speed threshold, followed by the vertical orientation data indicating that the micromobility vehicle 12 is in the horizontal position after the collision warning was generated, (viii) receive the location data from the GPS 32, (ix) determine a time of the collision, and (x) communicate, using a communication device, such as the communication module 30, a collision alert to the a remote device, such as server 100, in response to determining that the collision has occurred, the collision alert including the location of the micromobility vehicle 12 and the time of the collision.

The present disclosure also includes a downed micromobility vehicle notification system, whereby the alert system controller 14 is configured to (i) receive the speed of the micromobility vehicle 12 from the speed sensor 17, (ii) receive the vertical orientation data of the micromobility vehicle from the one or more tilt sensors 20a and 20b, and (iii) generate a downed micromobility vehicle notification by activating a notification device, such as the one or more warning devices 34, in response to the speed of the micromobility vehicle 12 indicating that the micromobility vehicle 12 is not moving and the vertical orientation data indicating that the micromobility vehicle 12 is in the horizontal position. The notification can be a visual notification and/or an audible notification. The alert system controller 14 can also be configured to receive location data from the GPS 32 and communicate, using a communication device such as the communication module 30, a downed micromobility vehicle alert to at least one remote device, such as server 100, in response to the speed of the micromobility vehicle 12 indicating that the micromobility vehicle 12 is not moving and the vertical orientation data indicating that the micromobility vehicle 12 is in the horizontal position, the downed micromobility vehicle alert including the location of the micromobility vehicle 12. The alert system controller 14 can be further configured to determine whether a drive system for the micromobility vehicle is powered on based on a power signal from the drive system, such as the "Power On" signal from the vehicle controller 22, and generate the downed micromobility vehicle notification only when the micromobility vehicle is not powered on.

In other embodiments, the present disclosure includes a collision warning system for a micromobility vehicle 12 that detects a potential collision based on comparing an anticipated vertical acceleration of the micromobility vehicle 12 with a maximum allowable vertical acceleration of the micromobility vehicle. For example, the proximity sensor 16 can be mounted to the micromobility vehicle 12, directed towards terrain in front of the micromobility vehicle, and configured to sense a current distance to the terrain in front of the micromobility vehicle. The terrain can include a surface upon which the micromobility vehicle will be traveling as well as an object in front of the micromobility vehicle. The alert system controller 14 can be configured to (i) receive the current distance from the proximity sensor 16, (ii) determine a baseline distance by averaging the current distance over a predetermined time period, (iii) determine a difference between the current distance and the baseline distance, (iv) determine a rate at which the difference is changing, (v) determine an anticipated vertical acceleration of the micromobility vehicle 12 based on the rate at which the difference is changing, (vi) receive the speed of the micromobility vehicle from the speed sensor, (vii) determine a maximum allowable vertical acceleration of the micromobility vehicle 12 based on the speed of the micromobility vehicle 12, (viii) compare the anticipated vertical acceleration of the micromobility vehicle 12 with the maximum allowable vertical acceleration of the micromobility vehicle 12, and (ix) generate a collision warning by activating the one or more warning devices 34 to alert a rider of the micromobility vehicle 12 of a potential collision in response to the anticipated vertical acceleration being greater than the maximum allowable vertical acceleration. The controller can be further configured to set the maximum allowable vertical acceleration to a first value based on the speed of the micromobility vehicle 12 in response to the rate at which the difference is changing being a negative rate and to set the maximum allowable vertical acceleration to a second value based on the speed of the micromobility vehicle 12 in response to the rate at which the difference is changing being a positive rate, the first value being different from the second value. In such case, the negative rate corresponds to the potential collision being with an in ground hazard and the positive rate corresponds to the potential collision being with an above ground hazard.

The proximity sensor 16 can be mounted to the micromobility vehicle with an adjustable tilt device 18 and the alert system controller 14 can be further configured to control the adjustable tilt device 18 based on the speed of the micromobility vehicle 12 to adjust a measurement angle of the proximity sensor 16 relative to the terrain. For example, the alert system controller 14 can control the tilt device 18 to decrease the measurement angle of the proximity sensor 16 by pointing the proximity sensor 16 towards a focal point that is closer to the front of the micromobility vehicle 12. Similarly, the alert system controller 14 can control the tilt device 18 to increase the measurement angle of the proximity sensor 16 towards a focal point that is farther away from the front of the micromobility vehicle 12. The alert system controller 14, for example, can control the tilt device 18 and measurement angle based on a speed of the micromobility vehicle 12 detected by the speed sensor 17. For example, as the speed of the micromobility vehicle 12 increases, the alert system controller 14 can increase the measurement angle to direct the proximity sensor 16 towards a focal point that is farther away from a front of the micromobility vehicle 12. As the speed of the micromobility vehicle 12 decreases, the alert system controller 14 can decrease the measurement angle to direct the proximity sensor 16 towards a focal point that that is closer to a front of the micromobility vehicle 12. In this way, as the speed of the micromobility vehicle 12 increases, the alert system controller 14 can focus on objects and potential hazards that are farther away from the micromobility vehicle 12 and as the speed of the micromobility vehicle 12 decreases, the alert system controller 14 can focus on objects and potential hazards that are close to the micromobility vehicle 12. The tilt device 18 can comprise a tilt mechanism that physically tilts the proximity sensor 16 up and down. Additionally or alternatively, the tilt device 18 be implemented by electronically adjusting the focal point of the proximity sensor 16. For example, alert system controller 14 can be further configured to increase the measurement angle as the speed of the micromobility vehicle 12 increases to measure the current distance to the terrain that is further away from the micromobility vehicle 12 and to decrease the measurement angle as the speed of the micromobility vehicle decreases to measure the current distance to the terrain that is closer to the micromobility vehicle 12.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

As used herein, the phrase at least one of A, B, and C should be construed to mean a logical (A OR B OR C), using a non-exclusive logical OR. For example, the phrase at least one of A, B, and C should be construed to include any one of: (i) A alone; (ii) B alone; (iii) C alone; (iv) A and B together; (v) A and C together; (vi) B and C together; (vii) A, B, and C together. The phrase at least one of A, B, and C should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" or the term "controller" may refer to, be part of, or include processor hardware (shared, dedicated, or group) that executes code and memory hardware (shared, dedicated, or group) that stores code executed by the processor hardware.

The module or controller may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module or controller may communicate with other modules or controllers using the interface circuit(s). Although the module or controller may be depicted in the present disclosure as logically communicating directly with other modules or controllers, in various implementations the module or controller may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module or controller may be distributed among multiple modules or controllers that are connected via the communications system. For example, multiple modules or controllers may implement the same functionality distributed by a load balancing system. In a further example, the functionality of the module or controller may be split between a server (also known as remote, or cloud) module or controller and a client (or, user) module or controller. For example, the client module or controller may include a native or web application executing on a client device and in network communication with the server module or controller.

The term code, as used above, may include software, firmware, and/or microcode, and may refer to programs, routines, functions, classes, data structures, and/or objects. Shared processor hardware encompasses a single microprocessor that executes some or all code from multiple modules or controllers. Group processor hardware encompasses a microprocessor that, in combination with additional microprocessors, executes some or all code from one or more modules or controllers. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules or controllers. Group memory hardware encompasses a memory device that, in combination with other memory devices, stores some or all code from one or more modules or controllers.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A collision warning system for a micromobility vehicle comprising:
   at least one proximity sensor mounted to the micromobility vehicle and configured to sense a distance to an object located in front of the micromobility vehicle, the at least one proximity sensor including a LiDAR sensor;
   a speed sensor configured to sense a speed of the micromobility vehicle;
   at least one warning device; and
   a controller in communication with the at least one proximity sensor, the speed sensor, and the at least one warning device and having a bypass mode, a demonstration mode, and a warning mode, the controller being configured to (i) receive signal strengths of return signals received by the LiDAR sensor, (ii) determine whether the received signal strengths include a first predetermined signal strength corresponding to a first predetermined color of an object in front of the LiDAR sensor followed by a second predetermined signal strength corresponding to a second predetermined color of the object in front of the LiDAR sensor within a predetermined time period, (iii) enter the demonstration mode and set a speed threshold to zero in response determining that the received signal strengths include the first predetermined signal strength corresponding to the first predetermined color followed by the second predetermined signal strength corresponding to the second predetermined color within the predetermined time period, (iv) set the speed threshold to a predetermined speed value corresponding to a walking speed of a rider of the micromobility vehicle in response to determining that the received signal strengths do not include the first predetermined signal strength corresponding to the first predetermined color followed by the second predetermined signal strength corresponding to the second predetermined color within the predetermined time period (v) receive the speed of the micromobility vehicle from the speed sensor, (vi) compare the speed of the micromobility vehicle with the speed threshold, (vii) enter the bypass mode in response to the speed of the micromobility vehicle being less than the speed threshold, and (viii) enter the warning mode in response to the speed of the micromobility vehicle being greater than the speed threshold;

wherein, while in the bypass mode, the controller is further configured to not activate the at least one warning device;

wherein, while in the warning mode and the demonstration mode, the controller is further configured to (ix) receive the distance to the object from the at least one proximity sensor, (x) determine a closing velocity to the object based on the speed of the micromobility vehicle received from the speed sensor, (xi) calculate an estimated time until a potential collision with the object based on the distance to the object and the closing velocity, (xii) compare the estimated time until the potential collision with the object with a predetermined time threshold, and (xiii) generate a collision warning by activating the at least one warning device to alert a rider of the micromobility vehicle of the potential collision with the object in response to the estimated time until collision being less than the predetermined time threshold.

2. The collision warning system of claim 1, wherein the at least one proximity sensor includes at least one of a radar sensor, an ultrasonic sensor, and a camera.

3. The collision warning system of claim 1, wherein the at least one warning device includes an audio device that generates an audible warning and a lighting device that generates a visual warning.

4. The collision warning system of claim 1, wherein the controller is further configured to activate the at least one warning device at a plurality of intensity levels based on the estimated time until collision with the object.

5. The collision warning system of claim 1, wherein the at least one warning device is configured to alert a non-rider of the micromobility vehicle of the collision of the potential collision with the object.

6. The collision warning system of claim 1, wherein the controller is further configured to enter the bypass mode in response to the distance to the object being less than a predetermined distance threshold.

7. The collision warning system of claim 6, wherein the controller is further configured to set at least one of a blocked sensor flag and a defeated sensor flag based on the signal strengths of the return signals received by the LiDAR sensor.

8. The collision warning system of claim 1, wherein the at least one proximity sensor includes an addition sensor, the additional sensor being one of an additional LiDAR sensor, a radar sensor, an ultrasonic sensor, and a camera, the LiDAR sensor and the additional sensor being configured to have different detection cones relative to the micromobility vehicle.

9. The collision warning system of claim 1, wherein the controller is configured to calculate the estimated time until the potential collision based on a reaction time factor in addition to the distance to the object and the closing velocity, the reaction time factor being based on a size of the micromobility vehicle.

10. The collision warning system of claim 1, wherein the controller is further configured to, in response to the estimated time until collision being less than the predetermined time threshold, limit a maximum velocity of the micromobility vehicle.

11. The collision warning system of claim 10, wherein the controller is further configured to limit the maximum velocity of the micromobility vehicle by replacing a desired throttle position input value with a maximum acceptable throttle position value that is calculated by the controller based on the estimated time until the potential collision, the maximum acceptable throttle position value corresponding to a maximum speed that is greater than a minimum speed necessary for the rider of the micromobility vehicle to maintain control of the micromobility vehicle.

12. The collision warning system of claim 1, wherein the micromobility vehicle is a powered standing scooter.

* * * * *